US012621900B2

(12) United States Patent
Lei

(10) Patent No.: US 12,621,900 B2
(45) Date of Patent: May 5, 2026

(54) VEHICLE COMMUNICATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 613 days.

(21) Appl. No.: 17/976,110

(22) Filed: Oct. 28, 2022

(65) Prior Publication Data

US 2023/0048799 A1 Feb. 16, 2023

Related U.S. Application Data

(63) Continuation of application No. PCT/CN2021/117632, filed on Sep. 10, 2021.

(30) Foreign Application Priority Data

Sep. 29, 2020 (CN) .......................... 202011055754.9

(51) Int. Cl.
*H04W 76/28* (2018.01)
*H04W 76/15* (2018.01)
(52) U.S. Cl.
CPC ........... *H04W 76/28* (2018.02); *H04W 76/15* (2018.02)
(58) Field of Classification Search
CPC ............................. H04W 76/28; H04W 76/15
See application file for complete search history.

(56) References Cited

U.S. PATENT DOCUMENTS

2012/0236920 A1* 9/2012 Ben-Eli ............. H04W 52/0235
375/226
2013/0308507 A1* 11/2013 Wanstedt .......... H04W 52/0216
370/311
(Continued)

FOREIGN PATENT DOCUMENTS

CN 102932881 A 2/2013
CN 103024879 A 4/2013
(Continued)

OTHER PUBLICATIONS

Office Action with English Translation for Japanese Patent Application No. 2022-564150 dated Nov. 28, 2023, 6 pages.
(Continued)

*Primary Examiner* — Michael Thier
*Assistant Examiner* — Tracy Lauren Raimondo
(74) *Attorney, Agent, or Firm* — Crowell & Moring LLP

(57) ABSTRACT

Embodiments of this application provide a vehicle communication method and apparatus, a computer-readable medium, and an electronic device. The vehicle communication method includes: obtaining at least two discontinuous reception cycles for a vehicle communication data; selecting a target discontinuous reception cycle from the at least two discontinuous reception cycles; receiving the vehicle communication data based on the target discontinuous reception cycle; and adjusting the target discontinuous reception cycle for receiving the vehicle communication data based on the at least two discontinuous reception cycles according to a volume of the vehicle communication data received within a set time.

18 Claims, 5 Drawing Sheets

Obtain at least two discontinuous reception cycle values for a vehicle communication message — S210

Select one discontinuous reception cycle value from the at least two discontinuous reception cycle values as a target discontinuous reception cycle value; and receive the vehicle communication message based on the target discontinuous reception cycle value — S220

Adjust a discontinuous reception cycle of the vehicle communication message based on the at least two discontinuous reception cycle values according to a data volume of the vehicle communication message received within a set time — S230

(56) References Cited

U.S. PATENT DOCUMENTS

| | | | | |
|---|---|---|---|---|
| 2015/0131505 | A1 | 5/2015 | Dai | |
| 2019/0174411 | A1 | 6/2019 | Xu et al. | |
| 2019/0335396 | A1* | 10/2019 | Yang | H04W 52/0216 |
| 2019/0380166 | A1 | 12/2019 | Xie et al. | |
| 2020/0092937 | A1* | 3/2020 | Yang | H04W 28/0268 |
| 2022/0183103 | A1* | 6/2022 | Bao | H04W 72/1263 |
| 2022/0225180 | A1* | 7/2022 | Chen | H04W 36/0055 |
| 2022/0295397 | A1 | 9/2022 | Li | |
| 2023/0199909 | A1* | 6/2023 | Mohammad Soleymani | H04W 52/0216 370/329 |
| 2023/0254771 | A1* | 8/2023 | Shi | H04W 52/02 370/318 |

FOREIGN PATENT DOCUMENTS

| | | | |
|---|---|---|---|
| CN | 107222364 | A | 9/2017 |
| CN | 109429241 | A | 3/2019 |
| CN | 110520840 | A | 11/2019 |
| CN | 110572842 | A | 12/2019 |
| CN | 111107615 | A | 5/2020 |
| CN | 112153603 | A | 12/2020 |
| EP | 2809100 | A1 | 12/2014 |

OTHER PUBLICATIONS

Nokia, "KI#1, new solution: PO5 DRX configuration for QoS-aware and power-efficient communication," SA WG2 Meeting #140e S2-2005065, https://www.3gpp.org/ftp/tsg_sa/WG2_Arch/TSGS2_140e_Electronic/docs/S2-2005065.zip, Aug. 12, 2020, 5 pages.

Office Action issued in Chinese application CN202011055754.9 on Feb. 5, 2024, with summary in English appended, 10 pages.

Extended European Search Report for European Patent Application No. 21874214.6 dated Oct. 31, 2023, 10 pages.

International Search Report and Written Opinion with English Translation for International Patent Application No. PCT/CN2021/117632 dated Dec. 16, 2021, 12 pages.

* cited by examiner

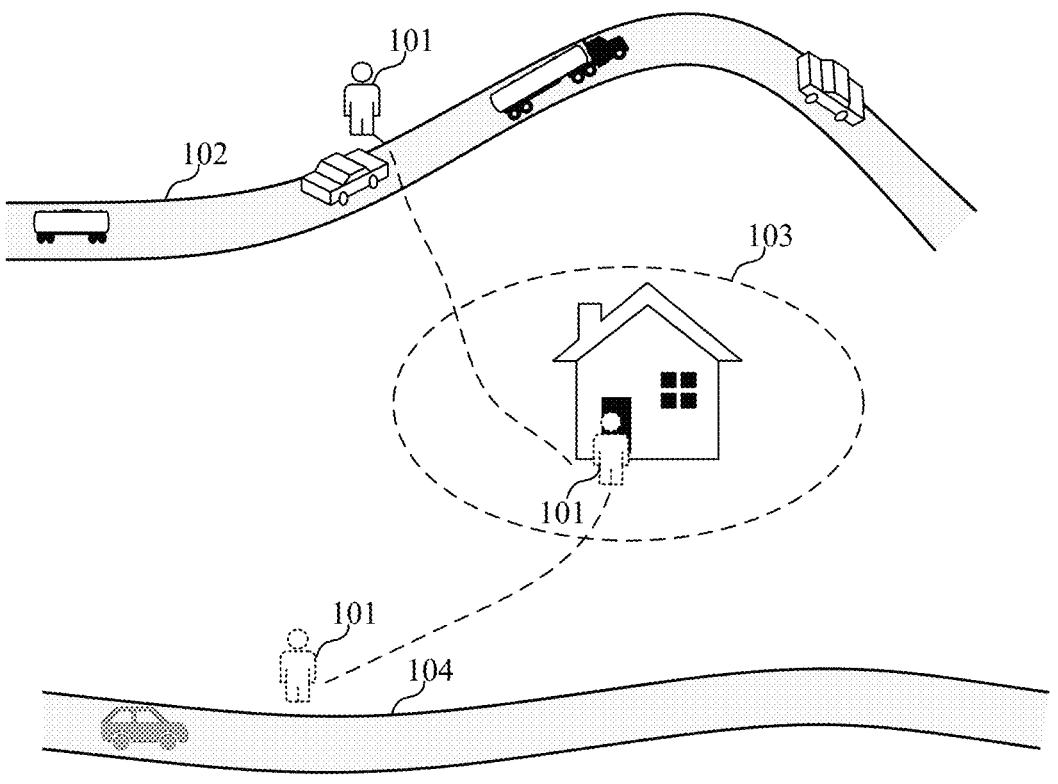

FIG. 1

| | |
|---|---|
| Obtain at least two discontinuous reception cycle values for a vehicle communication message | S210 |
| Select one discontinuous reception cycle value from the at least two discontinuous reception cycle values as a target discontinuous reception cycle value; and receive the vehicle communication message based on the target discontinuous reception cycle value | S220 |
| Adjust a discontinuous reception cycle of the vehicle communication message based on the at least two discontinuous reception cycle values according to a data volume of the vehicle communication message received within a set time | S230 |

FIG. 2

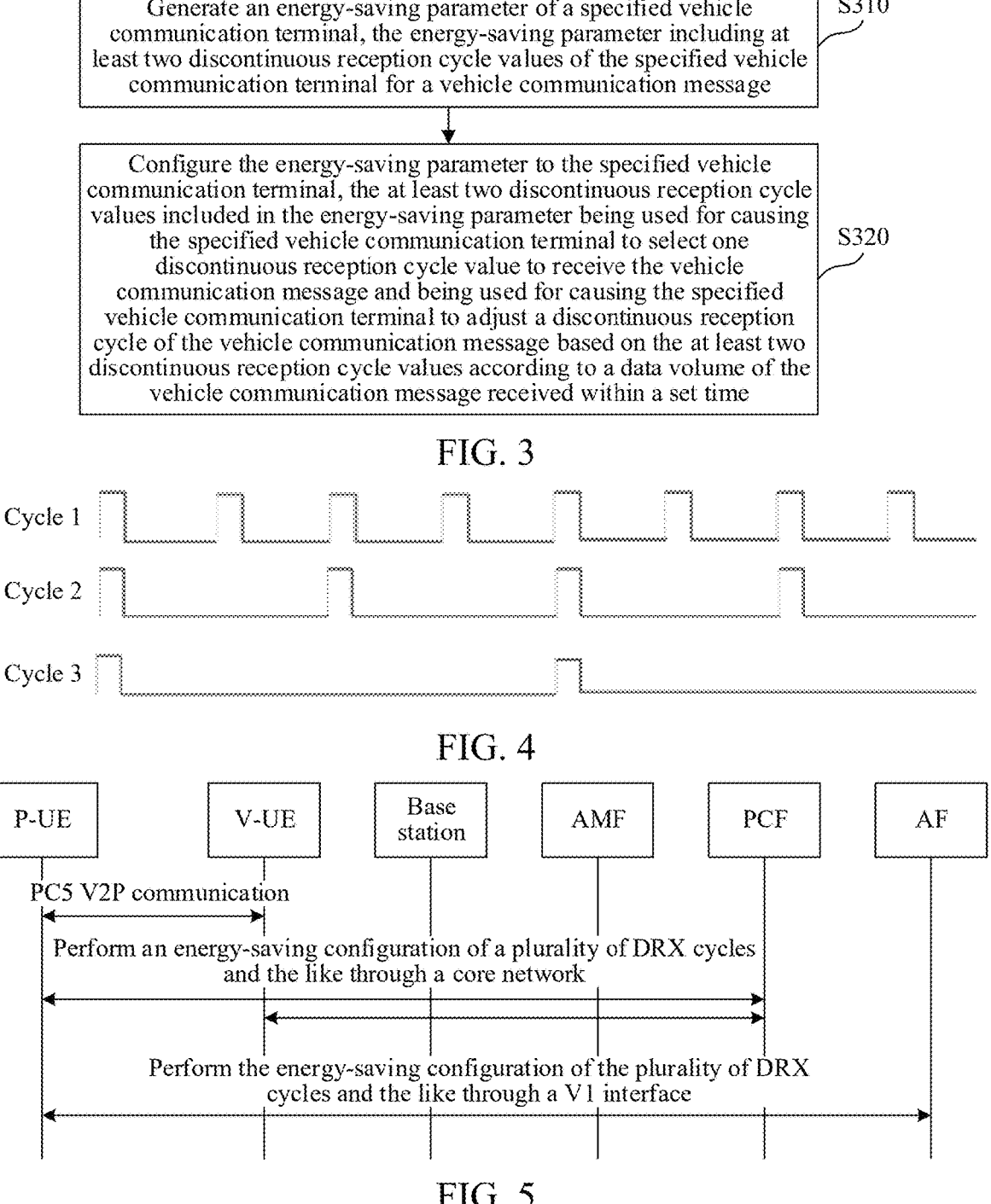

Generate an energy-saving parameter of a specified vehicle communication terminal, the energy-saving parameter including at least two discontinuous reception cycle values of the specified vehicle communication terminal for a vehicle communication message — S310

Configure the energy-saving parameter to the specified vehicle communication terminal, the at least two discontinuous reception cycle values included in the energy-saving parameter being used for causing the specified vehicle communication terminal to select one discontinuous reception cycle value to receive the vehicle communication message and being used for causing the specified vehicle communication terminal to adjust a discontinuous reception cycle of the vehicle communication message based on the at least two discontinuous reception cycle values according to a data volume of the vehicle communication message received within a set time — S320

FIG. 3

Cycle 1

Cycle 2

Cycle 3

FIG. 4

P-UE    V-UE    Base station    AMF    PCF    AF

PC5 V2P communication

Perform an energy-saving configuration of a plurality of DRX cycles and the like through a core network Perform the energy-saving configuration of the plurality of DRX cycles and the like through a V1 interface

FIG. 5

VEHICLE COMMUNICATION METHOD AND APPARATUS, COMPUTER-READABLE MEDIUM, AND ELECTRONIC DEVICE

RELATED APPLICATION

This application is a continuation application of PCT Patent Application No. PCT/CN2021/117632, filed on Sep. 10, 2021, which claims priority to Chinese Patent Application No. 202011055754.9, filed with the China National Intellectual Property Administration on Sep. 29, 2020, each of which is incorporated herein by reference in its entirety.

FIELD OF THE TECHNOLOGY

This application relates to the field of computer and communication technologies, and specifically, to a vehicle communication technology.

BACKGROUND OF THE DISCLOSURE

Vehicle to everything (V2X) communication provides vehicle information through what is mounted on a car, such as a sensor, a vehicle terminal, and the like, and implements vehicle to vehicle (V2V) communication, vehicle to infrastructure (V2I) communication, vehicle to pedestrian (V2P) communication, and vehicle to network (V2N) communication through various communication technologies.

Since an initial design of a V2X protocol is mainly for a vehicle user equipment (V-UE) with broadcasting as a main transmission method, there exists redundancy in a large amount of V2X messages, which may easily result in excessive power consumption of a pedestrian user equipment (P-UE) in the V2P. Therefore, an energy consumption problem of the P-UE in the V2X technology is a technical issue to be resolved urgently.

SUMMARY

Embodiments of this application provide a vehicle communication method and apparatus, a computer-readable medium and an electronic device, which can reduce power consumption of a vehicle communication terminal to a certain extent, reduce dependence of the vehicle communication terminal on a network, and improve adaptability of the vehicle communication terminal to a weak-network environment and a non-network environment.

Other characteristics and advantages of this application become apparent from the following detailed description, or may be learned in part through the practice of this application.

According to an aspect of the embodiments of this disclosure, a vehicle communication method is provided, performed by a vehicle communication terminal, the method including: obtaining at least two discontinuous reception cycle values for a vehicle communication message; selecting one discontinuous reception cycle value from the at least two discontinuous reception cycle values as a target discontinuous reception cycle value; receiving the vehicle communication message based on the target discontinuous reception cycle value; and adjusting a discontinuous reception cycle of the vehicle communication message based on the at least two discontinuous reception cycle values according to a data volume of the vehicle communication message received within a set time.

According to an aspect of the embodiments of this disclosure, a vehicle communication method is provided, performed by a network side device or a road side unit, the method including: generating an energy-saving parameter of a specified vehicle communication terminal, the energy-saving parameter including at least two discontinuous reception cycle values of the specified vehicle communication terminal for a vehicle communication message; and configuring the energy-saving parameter to the specified vehicle communication terminal, the at least two discontinuous reception cycle values included in the energy-saving parameter being used for causing the specified vehicle communication terminal to select one discontinuous reception cycle value therefrom to receive the vehicle communication message and being used for causing the specified vehicle communication terminal to adjust a discontinuous reception cycle of the vehicle communication message based on the at least two discontinuous reception cycle values according to a data volume of the vehicle communication message received within a set time.

According to an aspect of the embodiments of this disclosure, a vehicle communication apparatus is provided, including: an obtaining unit, configured to obtain at least two discontinuous reception cycle values for a vehicle communication message; a first processing unit, configured to select one discontinuous reception cycle value from the at least two discontinuous reception cycle values as a target discontinuous reception cycle value and receive the vehicle communication message based on the target discontinuous reception cycle value; and a second processing unit, configured to adjust a discontinuous reception cycle of the vehicle communication message based on the at least two discontinuous reception cycle values according to a data volume of the vehicle communication message received within a set time.

According to an aspect of the embodiments of this disclosure, a vehicle communication apparatus is provided, including: a generation unit, configured to generate an energy-saving parameter of a specified vehicle communication terminal, the energy-saving parameter including at least two discontinuous reception cycle values of the specified vehicle communication terminal for a vehicle communication message; and a configuration unit, configured to configure the energy-saving parameter to the specified vehicle communication terminal, the at least two discontinuous reception cycle values included in the energy-saving parameter being used for causing the specified vehicle communication terminal to select one discontinuous reception cycle value therefrom to receive the vehicle communication message and being used for causing the specified vehicle communication terminal to adjust a discontinuous reception cycle of the vehicle communication message based on the at least two discontinuous reception cycle values according to a data volume of the vehicle communication message received within a set time.

According to an aspect of the embodiments of this disclosure, a computer-readable medium is provided, storing a computer program, where when the computer program is executed by a processor, the vehicle communication method according to the foregoing embodiments is implemented.

According to a fourth aspect of the embodiments of this disclosure, an electronic device is provided, including: one or more processors; and a storage apparatus, configured to store one or more programs, the one or more programs, when executed by the one or more processors, causing the one or more processors to implement the vehicle communication method according to the foregoing embodiments.

According to an aspect of this application, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, so that the computer device performs the vehicle communication methods according to the foregoing various optional embodiments.

In the technical solutions according to the embodiments of this disclosure, the vehicle communication message is received based on the discontinuous reception cycle value selected from the at least two discontinuous reception cycle values, and through obtaining the at least two discontinuous reception cycle values for the vehicle communication message, which enables the vehicle communication terminal to save energy in a manner of discontinuous reception and reduces power consumption of the vehicle communication terminal. In addition, the discontinuous reception cycle of the vehicle communication message is adjusted based on the at least two discontinuous reception cycle values, and according to the data volume of the vehicle communication message received within the set time, which may, through a manner of adaptively adjusting the discontinuous reception cycle, achieve a matching between the power consumption of the vehicle communication terminal and the number of the received vehicle communication message, effectively reduce power consumption of the vehicle communication terminal with relatively fewer vehicle communication messages, and reduce dependence on the network, thereby improving adaptability of the vehicle communication terminal to a weak-network environment and a non-network environment.

BRIEF DESCRIPTION OF THE DRAWINGS

FIG. 1 is a schematic diagram of an application scenario to which technical solutions of the embodiments of this disclosure may be applicable.

FIG. 2 is a flowchart of an exemplary vehicle communication method according to an embodiment of this disclosure.

FIG. 3 is a flowchart of an exemplary vehicle communication method according to an embodiment of this disclosure.

FIG. 4 is a schematic diagram of a plurality of discontinuous reception cycles according to an embodiment of this disclosure.

FIG. 5 is a flowchart of configuration of a plurality of discontinuous reception cycles according to an embodiment of this disclosure.

DESCRIPTION OF EMBODIMENTS

Figures 6, 7:
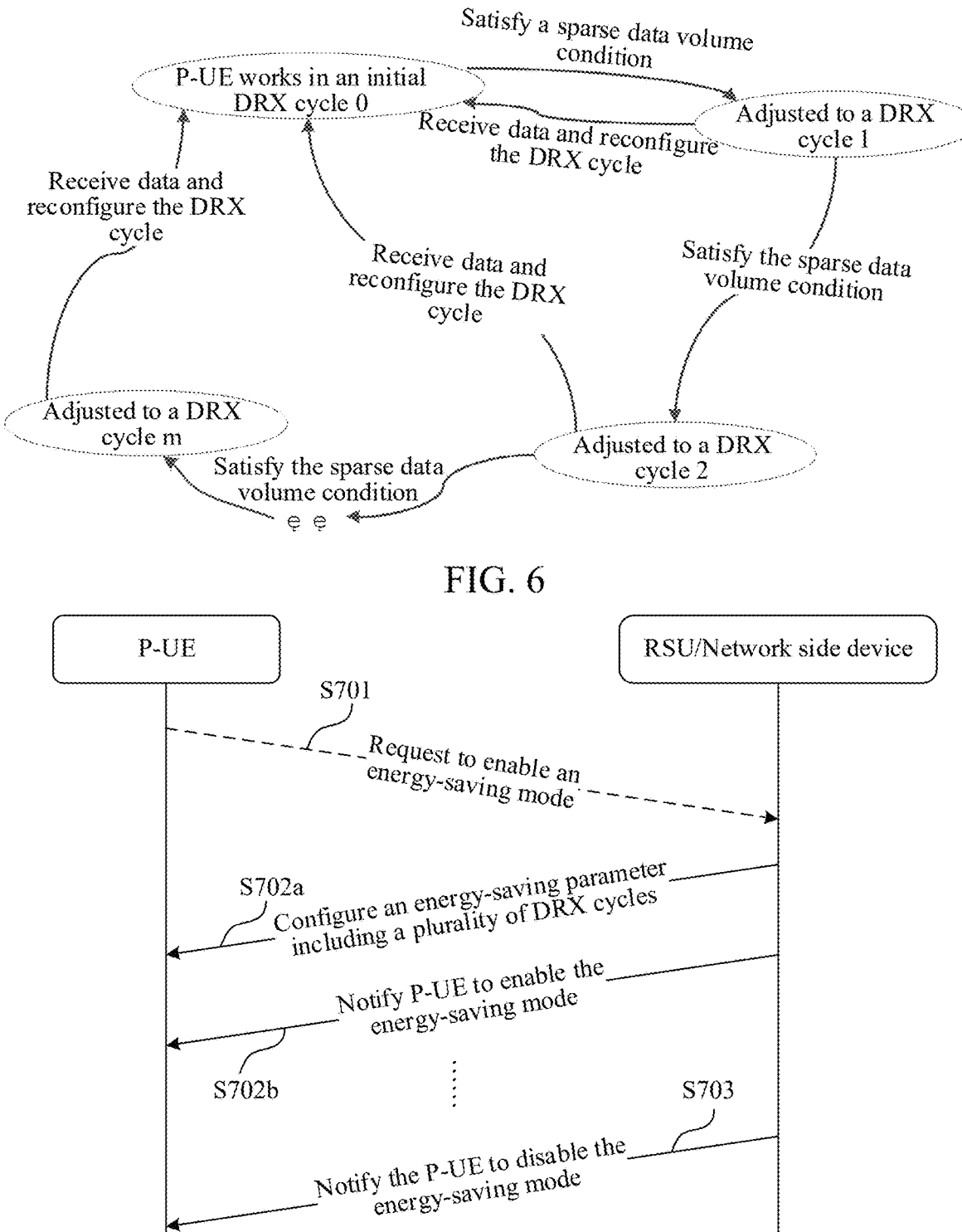
FIG. 6 is a schematic state transition diagram of a state machine of adjustment of DRX cycles by a P-UE according to an embodiment of this disclosure.
FIG. 7 is a schematic diagram of an interaction process between a road side unit (RSU)/network side device and a P-UE according to an embodiment of this disclosure.

"Plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

FIG. 1 is a schematic diagram of an application scenario to which technical solutions of the embodiments of this disclosure may be applicable.

In an application scenario shown in FIG. 1, a user 101 carries a P-UE. The user 101 may be located in a busy load section 102, or a residential area 103 without a V2P message, or a non-busy load section 104. The number of the V2P message is not the same in the busy road section 102, the residential area 103 and the non-busy road section 104. If the P-UE always remains the same reception state, unnecessary power consumption may be generated by the P-UE.

In an embodiment of this disclosure, the P-UE may be preconfigured with at least two discontinuous reception cycle values for receiving vehicle communication data, which may include vehicle communication message, or the P-UE may be configured with at least two discontinuous reception cycle values by a network side device in a case that the P-UE is within a network coverage range. Then, the P-UE adaptively selects a corresponding discontinuous reception cycle value according to the vehicle communication message in an actual location, so as to reduce the power consumption of the P-UE under a premise ensuring that the P-UE can receive the vehicle communication message.

For example, in an application scenario shown in FIG. 1, when the user 101 is located in the busy road section 102, there may be relatively dense V2P messages. In this case, the P-UE carried by the user 101 may receive the V2P messages based on a relatively small discontinuous reception cycle value (a cycle value may also be referred to as a cycle for simplicity).

When the user 101 is located in the residential area 103, there may be no V2P message or merely few V2P messages. In this case, the P-UE carried by the user 101 may select a relatively large discontinuous reception cycle value from the preconfigured or configured at least two discontinuous reception cycle values to receive the V2P message, so as to effectively reduce power consumption of the P-UE in a scenario without the V2P message or with few V2P messages.

When the user 101 is located in the non-busy road section 104, there are V2P messages in the non-busy road section 104, but the number of the V2P messages is not more than that in the busy road section 102. In this case, the P-UE carried by the user 101 may select a medium discontinuous reception cycle value from the preconfigured or configured at least two discontinuous reception cycle values (Optionally, the medium discontinuous reception cycle value is greater than the discontinuous reception cycle value used by the P-UE in the busy road section 102 and less than the discontinuous reception cycle value used by the P-UE in the residential area 103) to receive the V2P messages, so as to reduce power consumption of the P-UE under the premise ensuring that the P-UE can receive the vehicle communication message.

In an embodiment of this disclosure, the network side device or a road side unit may control whether the P-UE adaptively selects the corresponding discontinuous reception cycle value. For example, the network side device or the road side unit may transmit a notification signaling to a specified P-UE to notify the P-UE to enable an energy-saving mode; and accordingly, the P-UE may adaptively select the corresponding discontinuous reception cycle value according to the vehicle communication message in an actual location. Or, when determining that the energy-saving mode needs to be enabled, the P-UE may transmit a request message to the network side device or the road side unit, and the network side device or the road side unit determines whether the P-UE can enable the energy-saving mode. If the network side device or the road side unit determines that the P-UE can enable the energy-saving mode, a corresponding response message can be fed back to the P-UE. Accordingly, the P-UE can adaptively select the corresponding discontinuous reception cycle value according to the vehicle communication message in an actual location.

Therefore, the technical solutions of the embodiments of this disclosure can effectively reduce the power consumption of the P-UE under the premise ensuring that the P-UE can receive the V2P messages, and since the P-UE can be preconfigured with the at least two discontinuous reception cycle values, or the P-UE can be configured with the at least two discontinuous reception cycle values within a network coverage range, the adaptability of the P-UE to the weak-network environment or the non-network environment can be improved.

The implementation details of the technical solutions in the embodiments of this disclosure are described below in detail.

FIG. 2 is a flowchart of a vehicle communication method according to an embodiment of this disclosure. The vehicle communication method may be performed by a vehicle communication terminal, and the vehicle communication terminal may be a P-UE, apparently, or may alternatively be a vehicle terminal, or the like. Referring to FIG. 2, the vehicle communication method includes at least step S210 to step S230. A detailed description is as follows:

S210: Obtain at least two discontinuous reception cycle values for a vehicle communication message.

In an embodiment of this disclosure, a vehicle communication terminal may obtain the at least two discontinuous reception cycle values preconfigured for the vehicle communication message. For example, the vehicle communication terminal may obtain the at least two discontinuous reception cycle values preconfigured by a RSU through a PC5 interface between the vehicle communication terminal and the RSU.

In an embodiment of this disclosure, the vehicle communication terminal may alternatively receive the at least two discontinuous reception cycle values configured by a network side device in a case that the vehicle communication terminal is within a network coverage range. For example, the network side device may be a policy control function entity (PCF) entity. The PCF entity may configure the vehicle communication terminal with the at least two discontinuous reception cycle values through an access and mobility management function (AMF). For another example, the network side device may be an application function (AF) entity. The AF entity may configure the vehicle communication terminal with the at least two discontinuous reception cycle values through a V1 interface.

In an embodiment of this disclosure, another cycle value except a minimum non-zero cycle value among the at least two discontinuous reception cycle values obtained by the vehicle communication terminal is an integer multiple of the minimum non-zero cycle value. For example, if the minimum non-zero cycle value of the at least two discontinuous reception cycle values is T, another cycle value is nxT, n being a positive integer. The configuration manner of this discontinuous reception cycle may ensure that the vehicle communication message can be received no matter which discontinuous reception cycle value the vehicle communication terminal uses.

In an embodiment of this disclosure, in order to further ensure that the vehicle communication terminal can receive the vehicle communication message no matter which discontinuous reception cycle value is used, other vehicle communication terminals may use a minimum value of the at least two discontinuous reception cycle values to transmit the vehicle communication message.

In an embodiment of this disclosure, the vehicle communication message may be a message such as a safety reminder (such as collision warning) message, an efficiency reminder (such as congestion reminder) message, an infotainment reminder (such as map updating and route planning) message, or the like.

Step 220: Select one discontinuous reception cycle value from the at least two discontinuous reception cycle values as a target discontinuous reception cycle value; and receive the vehicle communication message based on the target discontinuous reception cycle value.

In an embodiment of this disclosure, any one of the at least two discontinuous reception cycle values may be selected as the target discontinuous reception cycle value; and the vehicle communication message is received based on the selected target discontinuous reception cycle value. Or, a minimum discontinuous reception cycle value may be selected from the at least two discontinuous reception cycle values as the target discontinuous reception cycle value, which can ensure that the vehicle communication terminal can receive the vehicle communication messages as many as possible. Or, a maximum discontinuous reception cycle value may be selected from the at least two discontinuous reception cycle values as the target discontinuous reception cycle value, which can reduce communication power consumption required by the vehicle communication terminal.

Still referring to FIG. 2, S230: Adjust a discontinuous reception cycle of the vehicle communication message based on the at least two discontinuous reception cycle values according to a data volume of the vehicle communication message received within a set time, for example, a predefined time duration. In some example implementations, the set time may also be set dynamically by a road side unit or a network side device In an embodiment of this disclosure, if the data volume of the vehicle communication message received within the set time is less than or equal to a first threshold, the discontinuous reception cycle of the vehicle communication message is increased based on the at least two discontinuous reception cycle values.

In an embodiment of this disclosure, a process of increasing the discontinuous reception cycle of the vehicle communication message may specifically be: in a case that the vehicle communication message is received based on the target discontinuous reception cycle value, if the data volume of the vehicle communication message received within the set time is less than or equal to the first threshold, increasing the discontinuous reception cycle of the vehicle communication terminal based on (e.g., select from) the at least two discontinuous reception cycle values, until the discontinuous reception cycle of the vehicle communication terminal reaches a maximum value among the at least two discontinuous reception cycle values. For example, when the vehicle communication terminal receives the vehicle communication message based on a discontinuous reception cycle 1, if the data volume of the vehicle communication message received within the set time is less than or equal to the first threshold, a discontinuous reception cycle 2 (the discontinuous reception cycle 2 is greater than the discontinuous reception cycle 1) may be used for receiving the vehicle communication message. The discontinuous reception cycle 2 is the minimal cycle that is greater than discontinuous reception cycle 1; and when the vehicle communication terminal receives the vehicle communication message based on the discontinuous reception cycle 2, if the data volume of the vehicle communication message received within the set time is still less than or equal to the first threshold, a discontinuous reception cycle 3 (the discontinuous reception cycle 3 is greater than the discontinuous reception cycle 2) may be used for receiving the vehicle communication message, and so on, until the discontinuous reception cycle of the vehicle communication terminal reaches a maximum value.

It is to be understood that the greater the discontinuous reception cycle value is, the lower reception frequency of the vehicle communication message is, and accordingly, the less communication power consumption required is.

In an embodiment of this disclosure, when the discontinuous reception cycle of the vehicle communication terminal is increased based on the at least two discontinuous reception cycle values, a discontinuous reception cycle value which is greater than and closest to the discontinuous reception cycle value (the target discontinuous reception cycle value) being used by the vehicle communication terminal may be selected from the at least two discontinuous reception cycle values. For example, a sequence of the at least two discontinuous reception cycle values from small to large is a discontinuous reception cycle 1, a discontinuous reception cycle 2, a discontinuous reception cycle 3, and a discontinuous reception cycle 4. Then, if the vehicle communication terminal is using the discontinuous reception cycle 1, the discontinuous reception cycle 2 is preferred to be used during increasing; and if the vehicle communication terminal is using the discontinuous reception cycle 2, the discontinuous reception cycle 3 is preferred to be used during increasing. Certainly, in other embodiments of this disclosure, if the vehicle communication terminal is using the discontinuous reception cycle 1, the discontinuous reception cycle 3 or the discontinuous reception cycle 4 may alternatively be used during increasing.

In an embodiment of this disclosure, the data volume of the vehicle communication message received within the set time is determined to be less than or equal to the first threshold, in a case that the data volume of the vehicle communication message received per unit time is less than or equal to a second threshold with a duration reaching the set time, the second threshold being less than or equal to the first threshold. Optionally, the first threshold and the second threshold may be values greater than or equal to 0.

In an embodiment of this disclosure, if the data volume of the vehicle communication message received within the set time is greater than or equal to a third threshold, the discontinuous reception cycle of the vehicle communication message is decreased based on the at least two discontinuous reception cycle values.

In an embodiment of this disclosure, a process of decreasing the discontinuous reception cycle of the vehicle communication message may specifically be: in a case that the vehicle communication message is received based on the target discontinuous reception cycle value, if the data volume of the vehicle communication message received within the set time is greater than or equal to the third threshold, decreasing the discontinuous reception cycle of the vehicle communication terminal based on the at least two discontinuous reception cycle values, until the discontinuous reception cycle of the vehicle communication terminal reaches a minimum value among the at least two discontinuous reception cycle values. For example, when the vehicle communication terminal receives the vehicle communication message based on the discontinuous reception cycle 4, if the data volume of the vehicle communication message received within the set time is greater than or equal to the third threshold, the discontinuous reception cycle 3 (the discontinuous reception cycle 3 is less than the discontinuous reception cycle 4) may be used for receiving the vehicle communication message; and when the vehicle communication terminal receives the vehicle communication message based on the discontinuous reception cycle 3, if the data volume of the vehicle communication message received within the set time is still greater than or equal to the third threshold, the discontinuous reception cycle 2 (the discontinuous reception cycle 2 is less than the discontinuous reception cycle 3) may be used for receiving the vehicle communication message, and so on, until the discontinuous reception cycle of the vehicle communication terminal reaches a minimum value.

It is to be understood that the less the discontinuous reception cycle value is, the higher reception frequency of the vehicle communication message is, and accordingly, the larger communication power consumption required is.

In an embodiment of this disclosure, when the discontinuous reception cycle of the vehicle communication terminal is decreased based on the at least two discontinuous reception cycle values, a discontinuous reception cycle value which is less than and closest to the discontinuous reception cycle value (the target discontinuous reception cycle value) being used by the vehicle communication terminal may be selected from the at least two discontinuous reception cycle values. For example, a sequence of the at least two discontinuous reception cycle values from small to large is a discontinuous reception cycle 1, a discontinuous reception cycle 2, a discontinuous reception cycle 3, and a discontinuous reception cycle 4. Then, if the vehicle communication terminal is using the discontinuous reception cycle 4, the discontinuous reception cycle 3 is preferred to be used during decreasing; and if the vehicle communication terminal is using the discontinuous reception cycle 3, the discontinuous reception cycle 2 is preferred to be used during decreasing. Certainly, in other embodiments of this disclosure, if the vehicle communication terminal is using the discontinuous reception cycle 4, the discontinuous reception cycle 2 or the discontinuous reception cycle 1 may alternatively be used during decreasing.

In an embodiment of this disclosure, the data volume of the vehicle communication message received within the set time is determined to be greater than or equal to the third threshold, in a case that the data volume of the vehicle communication message received per unit time is greater than or equal to a fourth threshold with a duration reaching the set time, the fourth threshold being greater than or equal to the third threshold. Optionally, the third threshold and the fourth threshold may be values that are greater than or equal to 0.

In an embodiment of this disclosure, the discontinuous reception cycle of the vehicle communication terminal is adjusted to a minimum value among the at least two discontinuous reception cycle values, in a case that the vehicle communication message is received, in a process that the vehicle communication terminal receives the vehicle communication message based on any one of the at least two discontinuous reception cycle values. Through the technical solutions of this embodiment, after the vehicle communication terminal receives the vehicle communication message, a minimum discontinuous reception cycle value may be selected from the at least two discontinuous reception cycle values as the target discontinuous reception cycle value, which can ensure that the vehicle communication terminal can receive the vehicle communication message as many as possible.

The data volume of the vehicle communication message involved in the foregoing embodiments may be the number of the vehicle communication message or may be the number of byte of the vehicle communication message. If the data volume of the vehicle communication message is the number of the vehicle communication message, then the first threshold, the second threshold, the third threshold and the fourth threshold in the foregoing embodiments are all values used for representing numbers. If the data volume of the vehicle communication message is the number of the byte of the vehicle communication message, then the first threshold, the second threshold, the third threshold and the fourth threshold in the foregoing embodiments are all values used for representing the amount of the byte.

In an embodiment of this disclosure, whether the vehicle communication terminal adopts the technical solution of the embodiment shown in FIG. 2 to save energy may be controlled by a road side unit or a network side device. For example, the vehicle communication terminal may receive a notification signaling transmitted by the road side unit or the network side device, the notification signaling being used for notifying a specified vehicle communication terminal whether to enable an energy-saving mode; and if the notification signaling notifies the vehicle communication terminal to enable the energy-saving mode, the vehicle communication terminal may adopt the technical solution of the embodiment shown in FIG. 2.

In an embodiment of this disclosure, the vehicle communication terminal may actively request to enable the energy-saving mode. For example, when determining that current power consumption is relatively large or current battery is relatively low, the vehicle communication terminal may request to enable the energy-saving mode. Specifically, when determining that the energy-saving mode needs to be enabled, the vehicle communication terminal transmits a request message of enabling the energy-saving mode to the road side unit or the network side device, and receives a response message fed back by the road side unit or the network side device for the request message; and if the response message indicates that the road side unit or the network side device allows the transmitter of the request message to enable the energy-saving mode (i.e., the request for enabling the energy-saving mode is granted), the vehicle communication terminal may adopt the technical solution of the embodiment shown in FIG. 2 to save energy.

In FIG. 2, the vehicle communication method of the embodiments of this disclosure is described from the perspective of the vehicle communication terminal. The following describes the technical solutions for vehicle communication from the perspective of the network side device or the road side unit with reference to FIG. 3.

FIG. 3 is a flowchart of a vehicle communication method according to an embodiment of this disclosure. The vehicle communication method may be performed by a network side device or a road side unit. Referring to FIG. 3, the vehicle communication method includes at least step S310 to step S320. A detailed description is as follows:

S310: Generate an energy-saving parameter of a specified vehicle communication terminal, the energy-saving parameter including at least two discontinuous reception cycle values of the specified vehicle communication terminal for a vehicle communication message.

In an embodiment of this disclosure, another cycle value except a minimum non-zero cycle value among the at least two discontinuous reception cycle values is an integer multiple of the minimum non-zero cycle value. For example, if the minimum non-zero cycle value of the at least two discontinuous reception cycle values is T, another cycle value is nxT, n being a positive integer. The technical solutions of this embodiment ensure that the vehicle communication message can be received no matter which discontinuous reception cycle value the vehicle communication terminal uses.

In an embodiment of this disclosure, the foregoing energy-saving parameter may further include time information when the vehicle communication terminal enables an energy-saving mode, the time information being used for indicating that the vehicle communication terminal uses the at least two discontinuous reception cycle values to receive the vehicle communication message at a corresponding time point.

In an embodiment of this disclosure, the foregoing energy-saving parameter may further include region information where the vehicle communication terminal enables an energy-saving mode, the region information being used for indicating that the vehicle communication terminal uses the at least two discontinuous reception cycle values to receive the vehicle communication message at a corresponding location.

S320: Configure the energy-saving parameter to the specified vehicle communication terminal, the at least two discontinuous reception cycle values included in the energy-saving parameter being used for causing the specified vehicle communication terminal to select one discontinuous reception cycle value therefrom to receive the vehicle communication message and being used for causing the specified vehicle communication terminal to adjust a discontinuous reception cycle of the vehicle communication message based on the at least two discontinuous reception cycle values according to a data volume of the vehicle communication message received within a set time.

In an embodiment of this disclosure, if the vehicle communication method shown in FIG. 3 is performed by a road side unit, the road side unit may configure the energy-saving parameter to the specified vehicle communication terminal through a PC5 interface. If the vehicle communication method shown in FIG. 3 is performed by a network side device, then if the network side device is a PCF entity, the PCF entity may configure the energy-saving parameter to the specified vehicle communication terminal through an AMF; and if the network side device is an AF entity, the AF entity may configure the energy-saving parameter to the specified vehicle communication terminal through a V1 interface.

In an embodiment of this disclosure, the network side device or the road side unit may transmit a notification signaling to the specified vehicle communication terminal, to notify the specified vehicle communication terminal whether to enable the energy-saving mode. If the notification signaling notifies the specified vehicle communication terminal to enable the energy-saving mode, the specified vehicle communication terminal may adopt the technical solution of the embodiment shown in FIG. 2 to save energy.

In an embodiment of this disclosure, in a case that the network side device or the road side unit receives a request message of enabling the energy-saving mode transmitted by the specified vehicle communication terminal, a response message for the request message may be fed back to the specified vehicle communication terminal, the response message being used for indicating whether to allow the specified vehicle communication terminal to enable the energy-saving mode. If the response message indicates that the road side unit or the network side device allows the transmitter of the request message to enable the energy-saving mode, the specified vehicle communication terminal may adopt the technical solution of the embodiment shown in FIG. 2 to save energy. Optionally, The network side device or the road side unit may determine whether to allow the vehicle communication terminal to enable the energy-saving mode according to configuration information and capability of the network side device or the road side unit.

The implementation details of the technical solutions in the embodiments of this disclosure are described below in detail with reference to FIG. 4 to FIG. 7.

The technical solutions in the embodiments of this disclosure mainly make the vehicle communication terminal (especially a pedestrian user equipment, the following description takes the P-UE as an example) adaptively dynamically adjust a discontinuous reception (DRX) cycle of a V2P message, thereby implementing energy saving of the P-UE. Specifically, The P-UE may negotiate with the network side device (or RSU) about a plurality of possible DRX cycle values, or the P-UE may be preconfigured with a plurality of DRX cycle values, thereby adaptively adjusting and receiving the DRX cycle used by the vehicle communication message through the plurality of DRX cycle values under a scenario with a weak network or without network coverage. Optionally, to ensure that the P-UE can obtain the V2P message no matter which DRX cycle is used, as shown in FIG. 4, the DRX cycle values in the plurality of DRX cycles are set to be integer multiples of a minimum DRX cycle value. For example, a cycle 2 is twice of a cycle 1, and a cycle 3 is 4 times of the cycle 1. A relationship between the number of a cycle and each cycle shown in FIG. 4 is merely schematic.

In an embodiment of this disclosure, as shown in FIG. 5, the P-UE may obtain energy-saving configuration such as the plurality of DRX cycles from PCF (through non-access stratum (NAS) level connection and transition by AMF) in a case that the P-UE is within a network coverage range. Or, the P-UE may obtain energy-saving configuration such as the plurality of DRX cycles from AF (through a V1 interface).

In an embodiment of this disclosure, the P-UE may alternatively obtain energy-saving configuration such as the plurality of DRX cycles in a manner of preconfiguration. For example, a frequency section in which the P-UE communicates through PC5 is not the frequency section to which a Uu interface is connected, that is to say, a connection based on the Uu interface may not exist; or the connection based on the Uu interface exists, but a long connection may not be maintained to continue to configure resources for the PC5; or the connection based on the Uu interface exists and can configure resources for the PC5, but strategically the Uu interface is not expected to frequently perform such configuration to implement the energy saving of the P-UE.

In a preconfiguration scenario, a preconfiguration server can configure all P-UEs in a certain region, so as to implement coordination of a P-UE energy-saving mechanism.

In an embodiment of this disclosure, since the P-UE is configured with a plurality of DRX cycle values, the P-UE may adaptively adjust the DRX cycle. During a process of adaptively adjusting the DRX cycle, the P-UE may select among the plurality of DRX cycles, and does not need to re-negotiate with the network side device or the road side unit or re-obtain configuration. Certainly, if the P-UE needs to be reconfigured with a plurality of DRX cycle values, a connected state needs to be entered.

In an embodiment of this disclosure, after receiving data, the P-UE which requires to save energy can adopt an initial cycle (the initial cycle may be a minimum cycle among the plurality of DRX cycles) among the plurality of DRX cycles and then wait to continue to receive data; and if there is no or less data received in a certain time, the DRX cycle is automatically increased until the DRX cycle of the P-UE reaches a maximum DRX value among the plurality of DRX cycles.

Specifically, after the P-UE obtains network configuration or preconfiguration of a plurality of DRX cycle values, considering that the P-UE may be located indoors and receive no V2P message, or there is less V2P messages in the location, therefore, in a case that there is no V2P message to receive or the reception frequency of the V2P message is very low, the P-UE may increase the DRX cycle. As shown in FIG. 6, assuming that a sequence of the DRX cycles from small to large is: a DRX cycle 0, a DRX cycle 1, a DRX cycle 2, . . . , a DRX cycle m, then the P-UE may work in an initial DRX cycle 0 in an initial stage. When the P-UE works in the DRX cycle 0, if the data volume is found getting sparse (for example, the number of the V2P message received per second is decreased down below a specific threshold or no V2P message is received) for a certain time t, the DRX cycle may be adjusted to the DRX cycle 1; if a sparse data volume condition is continuously satisfied and lasts for the time t, the DRX cycle is adjusted to the DRX cycle 2; and by analogy, if the sparse data volume condition is satisfied and lasts for the time t, the DRX cycle of the P-UE is increased to DRX cycle m. No matter in which DRX cycle the P-UE works, if the V2P message is received, the DRX cycle is reset to the DRX cycle 0 to ensure an effective reception of the V2P message.

The minimum value among the plurality of DRX cycles configured for the P-UE, as cycle 0 shown in FIG. 6, may be a DRX cycle being 0, that is, the P-UE continues to receive data, and in this case, the DRX cycle 1 is to be a non-zero DRX cycle.

In an embodiment of this disclosure, in a case of configuring the DRX cycles to the P-UE that requires to save energy, the data reception of the P-UE still needs to be ensured. Therefore, when the road side unit or another vehicle communication terminal (for example, a vehicle terminal) performs data transmission, the data may be transmitted according to the minimum DRX cycle among the plurality of DRX cycles, which can ensure that the V2P message can be received no matter which DRX cycle the P-UE uses. In addition, the timing when the road side unit or another vehicle communication terminal transmits data may further include reception timing of all P-UEs, so as to ensure that the P-UE does not miss any message. Therefore, in the embodiment of this disclosure, all the vehicle communication terminals (including the vehicle terminal and pedestrian user equipment and the like) may be synchronized. If the road side unit participates in the transmission of the V2P message, the road side unit needs to be synchronized with a V2P terminal. The essence of this design is to exchange the power consumption of the vehicle terminal and the road side unit for the energy saving of the P-UE. In an actual use, since the road side unit has continuous power supply and the vehicle terminal generally has a vehicle power supply, energy consumption is not an issue, but the P-UE is generally an Internet of Things device such as a mobile phone or a bracelet, and the energy consumption is limited. Therefore, the technical solutions of the embodiments of this disclosure have significant practical meaning.

In an embodiment of this disclosure, the RSU or the network side device (for example, a 5G network node) may notify the P-UE to enable or disable the energy-saving mode in the embodiment of this disclosure in a manner of signaling, because whether the energy-saving mode can be enabled is related to the capability of the network side device and deployment configuration. In addition, displayed configuration information of the RSU or the network side device may make another vehicle communication terminal to know whether the P-UE enables the energy-saving mode.

An interaction process between the foregoing RSU or network side device and the P-UE may be as shown in FIG. 7, including the following steps:

S701: The P-UE requests a RSU/Network side device to enable an energy-saving mode.

S701 is a step performed in a case that the P-UE actively requests to start the energy-saving mode, but the step is an optional step, and if the RSU/network side device directly notifies the P-UE to start the energy-saving mode, there is no need to perform S701.

S702a: The RSU/Network side device configures the P-UE with an energy-saving parameter including a plurality of DRX cycles. Optionally, the energy-saving parameter further includes time information of of the P-UE about enabling the energy-saving mode, region information of the P-UE about enabling the energy-saving mode, and the like. The time information is used for indicating that the P-UE enables the energy-saving mode at a corresponding time point, and the region information is used for indicating that the P-UE enables the energy-saving mode at a corresponding location.

S702b: The RSU/network side device notifies the P-UE to enable the energy-saving mode. After the RSU/network side device notifies the P-UE to enable the energy-saving mode, the P-UE may use a configured energy-saving parameter to receive the V2P message according to the manner of adaptively adjusting the DRX cycle in the foregoing embodiments.

There is no absolute performing sequence between step S702a and step S702b. In other words, step S702a can be performed first, and then step S702b can be performed according to the technical solution of the embodiment shown in FIG. 7; or step S702b can be performed first and then step S702a can be performed; or step S702a and step S702b can be performed simultaneously.

In addition, in some embodiments of this disclosure, if in a case that the P-UE actively requests to enable the energy-saving mode, then before the P-UE requests the RSU/network side device to enable the energy-saving mode, S702a is performed to configure the P-UE with the energy-saving parameter.

S703: When the energy-saving mode needs to be disabled, the RSU/network side device notifies the P-UE to disable the energy-saving mode.

Whether the energy-saving mode needs to be ended may be determined by the RSU/network side device, or may be determined by the P-UE. If whether the energy-saving mode needs to be disabled is determined by the P-UE, when the P-UE determines to disable the energy-saving mode, the P-UE may transmit a request message of disabling the energy-saving mode to the RSU/network side device, and then the RSU/network side device determines to allow the P-UE to disable the energy-saving mode, and the P-UE is notified to disable the energy-saving mode.

The technical solutions of the embodiments of this disclosure enable the vehicle communication terminal to save energy in a manner of discontinuous reception and reduce power consumption of the vehicle communication terminal. In addition, the vehicle communication terminal may achieve a matching between the power consumption of the vehicle communication terminal and the number of the currently received vehicle communication message through the configured plurality of discontinuous reception cycle values based on a manner of adaptively adjusting the discontinuous reception cycle, which may effectively reduce power consumption of the vehicle communication terminal with relatively fewer vehicle communication messages, and reduce dependence on the network, thereby improving adaptability of the vehicle communication terminal to a weak-network environment and a non-network environment.

The following describes apparatus embodiments of this disclosure, and the apparatus embodiments may be used for performing the vehicle communication method in the foregoing embodiment of this disclosure. For details not disclosed in the apparatus embodiments of this disclosure, reference may be made to the foregoing vehicle communication method embodiments of this disclosure.

Figures 8, 9:
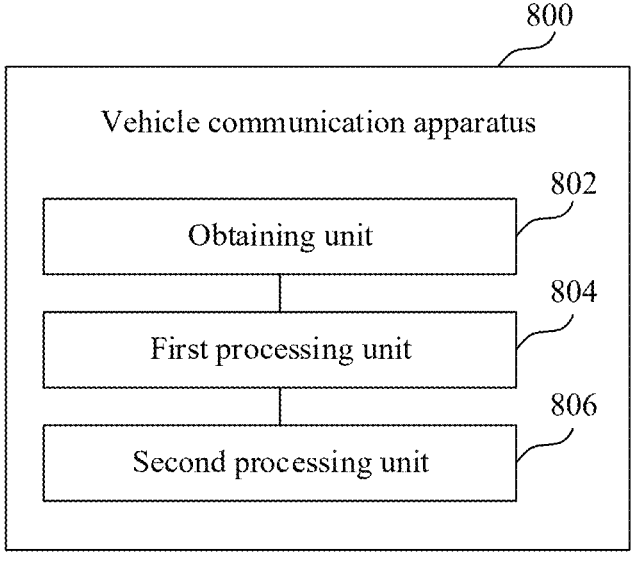
FIG. 8 is a block diagram of an exemplary vehicle communication apparatus according to an embodiment of this disclosure.
FIG. 9 is a block diagram of an exemplary vehicle communication apparatus according to an embodiment of this disclosure.

FIG. 8 is a block diagram of a vehicle communication apparatus according to an embodiment of this disclosure. The communication apparatus may be disposed in a vehicle communication terminal and the vehicle communication apparatus may be a pedestrian user equipment, a vehicle terminal certainly, or the like.

Referring to FIG. 8, a vehicle communication apparatus 800 according to an embodiment of this disclosure is provided, the apparatus including: an obtaining unit 802, a first processing unit 804, and a second processing unit 806.

The obtaining unit 802 is configured to obtain at least two discontinuous reception cycle values for a vehicle communication message. The first processing unit 804 is configured to select one discontinuous reception cycle value from the at least two discontinuous reception cycle values as a target discontinuous reception cycle value, and receive the vehicle communication message based on the target discontinuous reception cycle value. The second processing unit 806 is configured to adjust a discontinuous reception cycle of the vehicle communication message based on the at least two discontinuous reception cycle values according to a data volume of the vehicle communication message received within a set time.

In some embodiments of this disclosure, based on the foregoing solutions, the first processing unit 804 is configured to: receive a notification signaling transmitted by a road side unit or a network side device, the notification signaling being used for notifying the vehicle communication terminal whether to enable an energy-saving mode; and receive the vehicle communication message based on the target discontinuous reception cycle value in a case that the notification signaling notifies the vehicle communication terminal to enable the energy-saving mode.

In some embodiments of this disclosure, based on the foregoing solutions, the first processing unit 804 is configured to: in a case that it is determined that an energy-saving mode needs to be enabled, transmit a request message of enabling the energy-saving mode to a road side unit or a network side device, and receive a response message fed back by the road side unit or the network side device for the request message; and receive the vehicle communication message based on the target discontinuous reception cycle value in a case that the response message indicates that the road side unit or the network side device allows a transmitter of the request message to enable the energy-saving mode.

In some embodiments of this disclosure, based on the foregoing solutions, the obtaining unit 802 is configured to: obtain the at least two discontinuous reception cycle values preconfigured for the vehicle communication message; or receive the at least two discontinuous reception cycle values configured by a network side device in a case that the vehicle communication terminal is within a network coverage range.

In some embodiments of this disclosure, based on the foregoing solutions, the obtaining unit 802 is configured to: receive the at least two discontinuous reception cycle values configured by a policy control function entity; or receive the at least two discontinuous reception cycle values configured by an application function entity.

In some embodiments of this disclosure, based on the foregoing solutions, the first processing unit 804 is configured to: select any one of the at least two discontinuous reception cycle values as the target discontinuous reception cycle value; or select a minimum discontinuous reception cycle value from the at least two discontinuous reception cycle values as the target discontinuous reception cycle; or select a maximum discontinuous reception cycle value from the at least two discontinuous reception cycle values as the target discontinuous reception cycle value.

In some embodiments of this disclosure, based on the foregoing solutions, the second processing unit 806 is configured to:

increase the discontinuous reception cycle of the vehicle communication message based on the at least two discontinuous reception cycle values in a case that the data volume of the vehicle communication message received within the set time is less than or equal to a first threshold.

In some embodiments of this disclosure, based on the foregoing solutions, the second processing unit 806 is specifically configured to:

in a case that the target discontinuous reception cycle value is any discontinuous reception cycle value, increase the discontinuous reception cycle of the vehicle communication terminal based on the at least two discontinuous reception cycle values in a case that the data volume of the vehicle communication message received within the set time is less than or equal to a first threshold maximum value, until the discontinuous reception cycle value of the vehicle communication terminal reaches a maximum value among the at least two discontinuous reception cycle values.

In some embodiments of this disclosure, based on the foregoing solutions, the second processing unit 806 is configured to: select a discontinuous reception cycle value being greater than and closest to the target discontinuous reception cycle value from the at least two discontinuous reception cycle values.

In some embodiments of this disclosure, based on the foregoing solutions, the second processing 806 is further configured to: determine that the data volume of the vehicle communication message received within the set time is less than or equal to the first threshold, in a case that the data volume of the vehicle communication message received per unit time is less than or equal to a second threshold with a duration reaching the set time, the second threshold being less than or equal to the first threshold. In other words, the set time may include n time units, n being a positive integer. in response to the volume of the vehicle communication data received in each of the n time units being less than or equal to the second threshold, then determine that the volume of the vehicle communication data received within the set time is less than or equal to the first threshold.

In some embodiments of this disclosure, based on the foregoing solutions, the second processing unit 806 is configured to:

decrease the discontinuous reception cycle of the vehicle communication message based on the at least two discontinuous reception cycle values in a case that the data volume of the vehicle communication message received within the set time is greater than or equal to a third threshold.

In some embodiments of this disclosure, based on the foregoing solutions, the second processing 806 is further configured to: in a process of receiving the vehicle communication message based on any one of the at least two discontinuous reception cycle values, adjust the discontinuous reception cycle of the vehicle communication terminal to a minimum value among the at least two discontinuous reception cycle values, in a case that the vehicle communication message is received. In some embodiments of this disclosure, based on the foregoing solutions, another cycle value except a minimum non-zero cycle value among the at least two discontinuous reception cycle values is an integer multiple of the minimum non-zero cycle value.

In some embodiments of this disclosure, based on the foregoing solutions, the vehicle communication apparatus 800 is disposed in a pedestrian user equipment, and a transmission cycle of the vehicle communication message received by the pedestrian user equipment is a minimum value among the at least two discontinuous reception cycle values.

FIG. 9 is a block diagram of a vehicle communication apparatus according to an embodiment of this disclosure. The vehicle communication apparatus may be disposed in a network side device or a road side unit.

Referring to FIG. 9, a vehicle communication apparatus 900 according to an embodiment of this disclosure is provided, the apparatus including: a generation unit 902 and a configuration unit 904.

The generation unit 902 is configured to generate an energy-saving parameter of a specified vehicle communication terminal, the energy-saving parameter including at least two discontinuous reception cycle values of the specified vehicle communication terminal for a vehicle communication message. The configuration unit 904 is configured to configure the energy-saving parameter to the specified vehicle communication terminal, the at least two discontinuous reception cycle values included in the energy-saving parameter being used for causing the specified vehicle communication terminal to select one discontinuous reception cycle value therefrom to receive the vehicle communication message and being used for causing the specified vehicle communication terminal to adjust a discontinuous reception cycle of the vehicle communication message based on the at least two discontinuous reception cycle values according to a data volume of the vehicle communication message received within a set time.

In some embodiments of this disclosure, based on the foregoing solutions, the vehicle communication apparatus

900 further includes: a third processing unit, configured to: transmit a notification signaling to the specified vehicle communication terminal, the notification signaling being used for notifying the specified vehicle communication terminal whether to enable an energy-saving mode; or in a case that a request message of enabling the energy-saving mode transmitted by the specified vehicle communication terminal, feed back a response message for the request message to the specified vehicle communication terminal, the response message being used for indicating whether to allow the specified vehicle communication terminal to enable the energy-saving mode.

Figure 10:
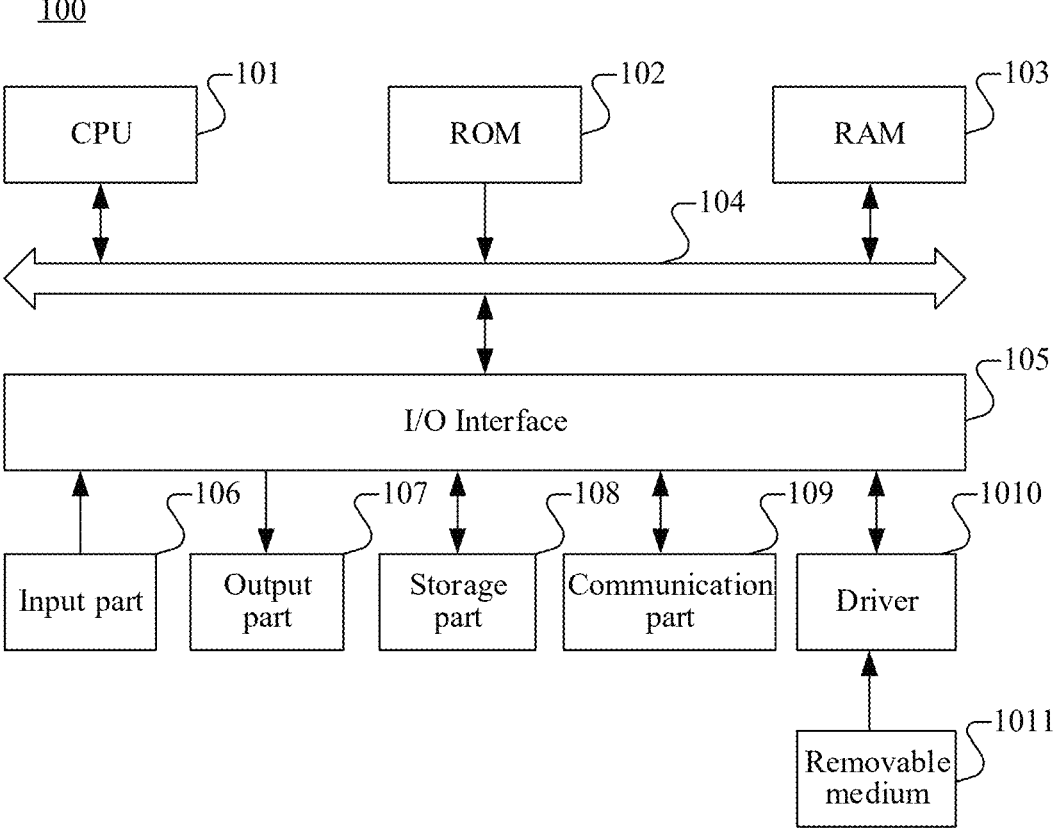
FIG. 10 is a schematic structural diagram of an exemplary computer system of an electronic device adapted to implement an embodiment of this disclosure.

FIG. 10 is a schematic structural diagram of a computer system of an electronic device adapted to implement an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module.

A computer system 1000 of the electronic device shown in FIG. 10 is merely an example, and does not constitute any limitation on functions and use ranges of the embodiments of this disclosure.

As shown in FIG. 10, the computer system 1000 includes a central processing unit (CPU) 1001, which may perform various suitable actions and processing based on a program stored in a read-only memory (ROM) 1002 or a program loaded from a storage part 1008 into a random access memory (RAM) 1003, for example, perform the method described in the foregoing embodiments. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following components are connected to the I/O interface 1005: an input part 1006 including a keyboard and a mouse, and the like; the storage portion 1007 including a cathode ray tube (CRT), a liquid crystal display (LCD), a loudspeaker, and the like; a storage part 1008 including hard disk, and the like; and a communication part 1009 including a network interface card such as a local area network (LAN) card, a modem, and the like. The communication part 1009 performs communication processing by using a network such as the Internet. A driver 1010 is also connected to the I/O interface 1005 as required. A removable medium 1011, such as a magnetic disk, an optical disc, a magneto-optical disk, or a semiconductor memory, is mounted on the driver 1010 as required, so that a computer program read from the removable medium is installed into the storage part 1008 as required.

Particularly, according to an embodiment of this disclosure, the processes described in the foregoing by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1009, and/or installed from the removable medium 1011. When the computer program is executed by the CPU 1001, the various functions defined in the system of this application are executed.

The computer-readable medium shown in the embodiments of this disclosure may be a non-transitory computer-readable signal medium or a non-transitory computer-readable storage medium or any combination thereof. The computer-readable storage medium may be, for example, but is not limited to, an electric, magnetic, optical, electro-magnetic, infrared, or semi-conductive system, apparatus, or device, or any combination thereof. More specific examples of the non-transitory computer readable storage medium may include, but are not limited to: an electrical connection having one or more wires, a portable computer magnetic disk, a hard disk, a RAM, a ROM, an erasable programmable read only memory (EPROM), a flash memory, an optical fiber, a compact disc read-only memory (CD-ROM), an optical storage device, a magnetic storage device, or any appropriate combination thereof. In this application, the non-transitory computer-readable storage medium may be any tangible medium including or storing a program, and the program may be used by or in combination with an instruction execution system, apparatus, or device. In this application, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may be further any computer-readable medium in addition to a non-transitory computer-readable storage medium. The computer-readable medium may send, propagate, or transmit a program that is used by or used in combination with an instruction execution system, apparatus, or device. The computer program included in the non-transitory computer-readable storage medium may be transmitted using any suitable medium, including but not limited to: a wireless medium, a wired medium, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code comprises one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this disclosure may be implemented in a software manner, or may be implemented in a hardware manner, and the unit described can also be set in a processor. Names of these units do not constitute a limitation on the units in a case.

In another aspect, this application further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this application, the features and functions of two or more modules or units described above may be specified in one module or unit. Conversely, the features and functions of one module or unit described above may be further divided into a plurality of modules or units to be embodied.

Through the description of the foregoing embodiments, a person skilled in the art can easily understand that the exemplary implementations described herein may be implemented by software, or may be implemented by combining software with necessary hardware. Therefore, the technical solutions of the embodiments of this disclosure may be implemented in a form of a software product. The software product may be stored in a non-transitory storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this disclosure.

After considering the specification and practicing the implementations of the present disclosure, a person skilled in the art may easily conceive of other implementations of this application. This application is intended to cover any variation, use, or adaptive change of this application. These variations, uses, or adaptive changes follow the general principles of this application and include common general knowledge or common technical means in the art that are not disclosed in this application.

It should be understood that this application is not limited to the precise structures described above and shown in the accompanying drawings, and various modifications and changes can be made without departing from the scope of this application. The scope of this application is subject only to the appended claims.

What is claimed is:

1. A method for vehicle communication, performed by a vehicle communication terminal, the method comprising:
obtaining at least two discontinuous reception cycles for a vehicle communication data;
selecting a target discontinuous reception cycle from the at least two discontinuous reception cycles;
receiving the vehicle communication data based on the target discontinuous reception cycle; and
adjusting the target discontinuous reception cycle for receiving the vehicle communication data based on the at least two discontinuous reception cycles according to a volume of the vehicle communication data received within a set time comprising n time units, n being a positive integer, wherein the adjusting comprises:
determining that the volume of the vehicle communication data received within a set time is less than or equal to a first threshold, in response to the volume of the vehicle communication data received in each of the n time units being less than or equal to a second threshold, the second threshold being less than or equal to the first threshold; and
increasing the target discontinuous reception cycle in response to the volume of the vehicle communication data received within the set time being less than or equal to the first threshold.

2. The method according to claim 1, wherein:
before receiving the vehicle communication data based on the target discontinuous reception cycle, the method further comprises:
receiving a notification signaling transmitted by a road side unit or a network side device, the notification signaling being used for notifying the vehicle communication terminal whether to enable an energy-saving mode; and
receiving the vehicle communication data based on the target discontinuous reception cycle comprises:
receiving the vehicle communication data based on the target discontinuous reception cycle in response to the notification signaling notifying the vehicle communication terminal to enable the energy-saving mode.

3. The method according to claim 1, wherein:
before receiving the vehicle communication data based on the target discontinuous reception cycle, the method further comprises:
in a determination that an energy-saving mode needs to be enabled, transmitting a request to a road side unit or a network side device for enabling the energy-saving mode, and receiving a response indicating whether the request is granted; and
receiving the vehicle communication data based on the target discontinuous reception cycle comprises:
receiving the vehicle communication data based on the target discontinuous reception cycle in response to the request being granted.

4. The method according to claim 1, wherein obtaining the at least two discontinuous reception cycles for a vehicle communication data comprises one of:
obtaining the at least two discontinuous reception cycles preconfigured for the vehicle communication data; or
receiving the at least two discontinuous reception cycles configured by a network side device in response to the vehicle communication terminal being within a network coverage range.

5. The method according to claim 4, wherein receiving the at least two discontinuous reception cycles configured by the network side device comprises:
receiving the at least two discontinuous reception cycles configured by a policy control function entity; or
receiving the at least two discontinuous reception cycles configured by an application function entity.

6. The method according to claim 1, wherein selecting the target discontinuous reception cycle comprises one of:
selecting any one of the at least two discontinuous reception cycles as the target discontinuous reception cycle;
selecting a minimum discontinuous reception cycle from the at least two discontinuous reception cycles as the target discontinuous reception cycle; or
selecting a maximum discontinuous reception cycle from the at least two discontinuous reception cycles as the target discontinuous reception cycle.

7. The method according to claim 1, wherein increasing the target discontinuous reception cycle based on the at least two discontinuous reception cycles in response to the volume of the vehicle communication data received within the set time being less than or equal to a first threshold comprises:
increasing the target discontinuous reception cycle based on the at least two discontinuous reception cycles in response the volume of the vehicle communication data received within the set time being less than or equal to the first threshold, until the target discontinuous reception cycle reaches a maximum value among the at least two discontinuous reception cycles.

8. The method according to claim 7, wherein increasing the target discontinuous reception cycle based on the at least two discontinuous reception cycles comprises:
selecting a discontinuous reception cycle being greater than and closest to the target discontinuous reception cycle from the at least two discontinuous reception cycles as an updated target discontinuous reception cycle.

9. The method according to claim 1, wherein the adjusting the target discontinuous reception cycle comprises:
decreasing the target discontinuous reception cycle based on the at least two discontinuous reception cycles in responses to the volume of the vehicle communication data received within the set time being greater than or equal to a third threshold.

10. The method according to claim 9, further comprising:
selecting a minimum value among the at least two discontinuous reception cycles as the target discontinuous reception cycle, when determining that there is vehicle communication data being received.

11. The method according to claim 1, wherein a cycle except a minimum cycle among the at least two discontinuous reception cycles is an integer multiple of the minimum cycle.

12. The method according to claim 1, wherein the vehicle communication terminal is a pedestrian user equipment, and a transmission cycle of the vehicle communication data received by the pedestrian user equipment is a minimum cycle among the at least two discontinuous reception cycles.

13. A method for vehicle communication, performed by a network side device or a road side unit, the method comprising:
generating an energy-saving parameter for a vehicle communication terminal, the energy-saving parameter comprising at least two discontinuous reception cycles; and
configuring the energy-saving parameter to the vehicle communication terminal, the at least two discontinuous reception cycles comprised in the energy-saving parameter being used for causing the vehicle communication terminal to select one discontinuous reception cycle therefrom to receive vehicle communication data and being used for causing the vehicle communication terminal to adjust a discontinuous reception cycle used for receiving the vehicle communication data based on the at least two discontinuous reception cycles according to a volume of the vehicle communication data received within a set time comprising n time units, n being a positive integer, wherein causing the vehicle communication terminal to adjust the discontinuous reception cycle comprises:
determining that the volume of the vehicle communication data received within a set time is less than or equal to a first threshold, in response to the volume of the vehicle communication data received in each of the n time units being less than or equal to a second threshold, the second threshold being less than or equal to the first threshold; and
increasing the discontinuous reception cycle in response to the volume of the vehicle communication data received within the set time being less than or equal to the first threshold.

14. The method according to claim 13, further comprising:
transmitting a notification signaling to the vehicle communication terminal, the notification signaling being used for notifying the vehicle communication terminal whether to enable an energy-saving mode; or
in response to a request for enabling the energy-saving mode transmitted by the vehicle communication terminal being received, sending a response message to the vehicle communication terminal, the response message being used for indicating whether the request is granted.

15. A device for vehicle communication, the device comprising a memory for storing computer instructions and a processor in communication with the memory, wherein, when the processor executes the computer instructions, the processor is configured to cause the device to:
obtain at least two discontinuous reception cycles for a vehicle communication data;
select a target discontinuous reception cycle from the at least two discontinuous reception cycles;
receive the vehicle communication data based on the target discontinuous reception cycle; and
adjust the target discontinuous reception cycle for receiving the vehicle communication data based on the at least two discontinuous reception cycles according to a volume of the vehicle communication data received within a set time comprising n time units, n being a positive integer, wherein the processor is further configured to:
determine that the volume of the vehicle communication data received within a set time is less than or equal to a first threshold, in response to the volume of the vehicle communication data received in each of the n time units being less than or equal to a second threshold, the second threshold being less than or equal to the first threshold; and
increase the target discontinuous reception cycle in response to the volume of the vehicle communication data received within the set time being less than or equal to the first threshold.

16. The device according to claim 15, wherein:
before the processor is configured to cause the device to receive the vehicle communication data based on the target discontinuous reception cycle, the processor is configured to further cause the device to:
receive a notification signaling transmitted by a road side unit or a network side device, the notification signaling being used for notifying a vehicle communication terminal whether to enable an energy-saving mode; and
when the processor is configured to cause the device to receive the vehicle communication data based on the target discontinuous reception cycle, the processor is configured to cause the device to:
receiving the vehicle communication data based on the target discontinuous reception cycle in response to the notification signaling notifying the vehicle communication terminal to enable the energy-saving mode.

17. The device according to claim 15, wherein:
before the processor is configured to cause the device to receive the vehicle communication data based on the target discontinuous reception cycle, the processor is configured to further cause the device to:
in a determination that an energy-saving mode needs to be enabled, transmit a request to a road side unit or a network side device for enabling the energy-saving mode, and receive a response indicating whether the request is granted; and wherein, when the processor is configured to cause the device to receive the vehicle communication data based on the target discontinuous reception cycle, the processor is configured to cause the device to:

receive the vehicle communication data based on the target discontinuous reception cycle in response to the request being granted.

18. The device according to claim 15, wherein, when the processor is configured to cause the device to obtain the at least two discontinuous reception cycles for a vehicle communication data, the processor is configured to cause the device to perform one of:

obtaining the at least two discontinuous reception cycles preconfigured for the vehicle communication data; or receiving the at least two discontinuous reception cycles configured by a network side device in response to a vehicle communication terminal being within a network coverage range.

* * * * *